(12) United States Patent
Kameyama

(10) Patent No.: US 7,599,149 B2
(45) Date of Patent: Oct. 6, 2009

(54) MAGNETIC HEAD INCLUDING BUFFER MEMBER ON GROOVE PART, METHOD OF MANUFACTURING SAME, AND MAGNETIC DISK UNIT INCLUDING SAME

(75) Inventor: Masaki Kameyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 418 days.

(21) Appl. No.: 11/434,056

(22) Filed: May 16, 2006

(65) Prior Publication Data

US 2007/0206327 A1 Sep. 6, 2007

(30) Foreign Application Priority Data

Mar. 6, 2006 (JP) .............................. 2006-060014

(51) Int. Cl.
*G11B 5/60* (2006.01)
(52) U.S. Cl. ................................. 360/236.3
(58) Field of Classification Search ............ 360/236.3, 360/237, 235.9, 237.1
See application file for complete search history.

(56) References Cited

U.S. PATENT DOCUMENTS

| | | | | |
|---|---|---|---|---|
| 6,229,671 B1 * | 5/2001 | Boutaghou et al. | ........ | 360/235.1 |
| 6,243,233 B1 * | 6/2001 | Yamamoto et al. | ........ | 360/236.6 |
| 6,252,742 B1 * | 6/2001 | Kameyama | .................. | 360/237 |
| 6,292,332 B1 * | 9/2001 | Peng | ........................ | 360/236.8 |
| 6,351,345 B1 * | 2/2002 | Kameyama | .............. | 360/236.3 |
| 6,490,134 B2 * | 12/2002 | Boutaghou | ................ | 360/235.7 |
| 6,490,136 B1 * | 12/2002 | Ito et al. | ................... | 360/236.4 |
| 6,504,682 B1 * | 1/2003 | Sannino et al. | .......... | 360/235.8 |
| 6,535,353 B2 * | 3/2003 | Boutaghou et al. | ....... | 360/235.1 |
| 6,538,849 B1 * | 3/2003 | Fayeulle et al. | .......... | 360/236.3 |
| 6,771,468 B1 * | 8/2004 | Levi et al. | ................. | 360/235.5 |
| 6,950,281 B2 * | 9/2005 | Kameyama | .................. | 360/235 |
| 7,072,146 B2 * | 7/2006 | Tokuyama et al. | ........ | 360/236.3 |
| 7,145,752 B2 * | 12/2006 | Ueda et al. | ............... | 360/235.6 |
| 7,283,329 B2 * | 10/2007 | Feliss et al. | .............. | 360/235.3 |
| 7,352,531 B2 * | 4/2008 | Kameyama | .............. | 360/235.6 |
| 2002/0145828 A1 * | 10/2002 | Mundt et al. | ............. | 360/235.6 |
| 2007/0025022 A1 * | 2/2007 | Agari et al. | .............. | 360/235.8 |

FOREIGN PATENT DOCUMENTS

JP 2002-133632 5/2002

* cited by examiner

*Primary Examiner*—Jefferson Evans
(74) *Attorney, Agent, or Firm*—Greer, Burns & Crain, Ltd.

(57) ABSTRACT

A magnetic head is disclosed that includes a head slider having a medium opposing surface to oppose a magnetic recording medium, the head slider being configured to fly by receiving airflow, caused by the movement of the magnetic recording medium, on the medium opposing surface, the medium opposing surface including an air bearing surface and a groove part, the groove part being lower than the air bearing surface; and a buffer member configured to prevent the magnetic recording medium from being damaged when the groove part comes into contact with the magnetic recording medium, the buffer member being provided on a part of the surface of the groove part in the peripheral part of the medium opposing surface.

6 Claims, 14 Drawing Sheets

FIG.4
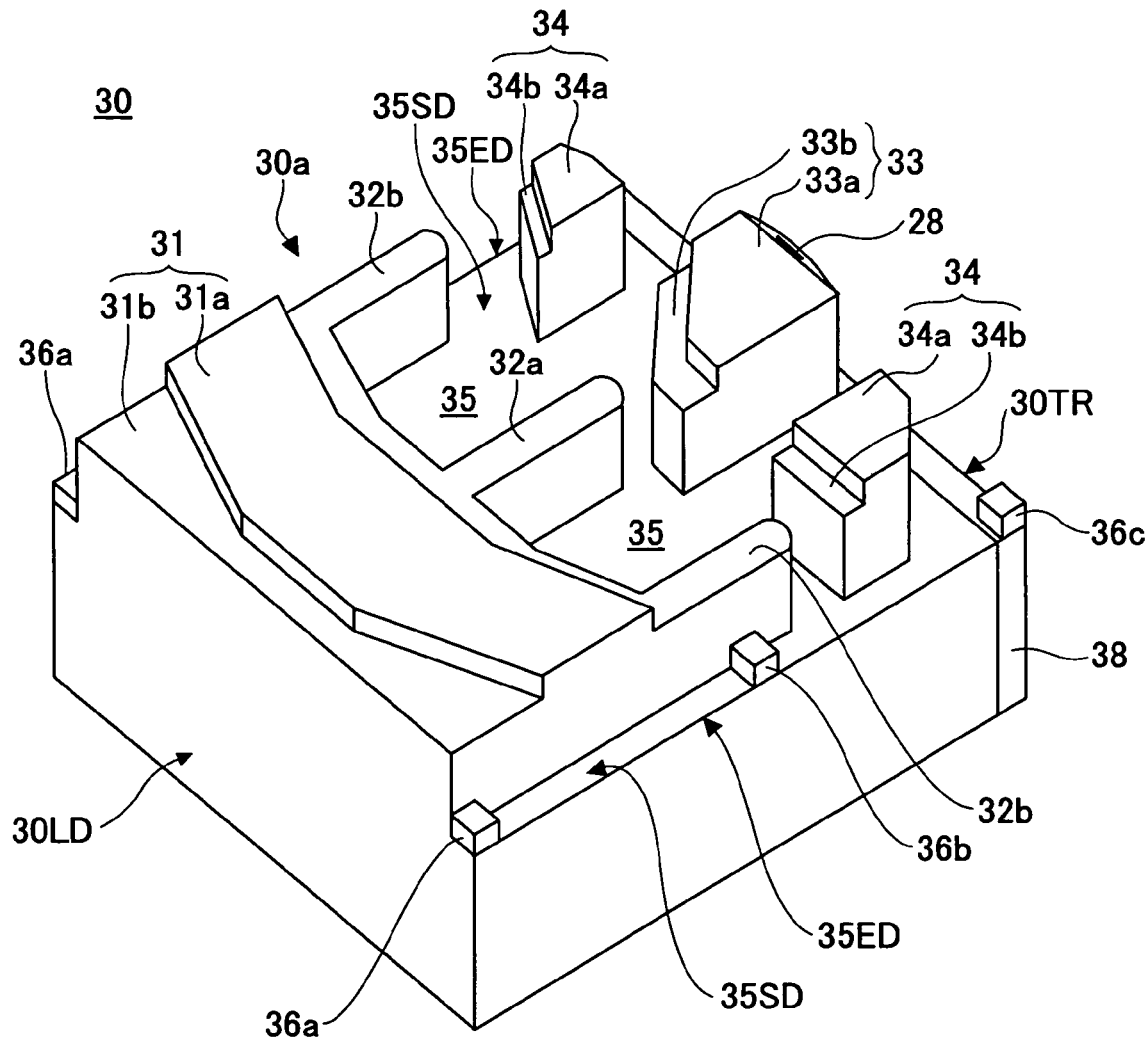
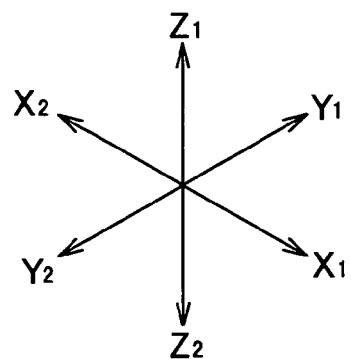

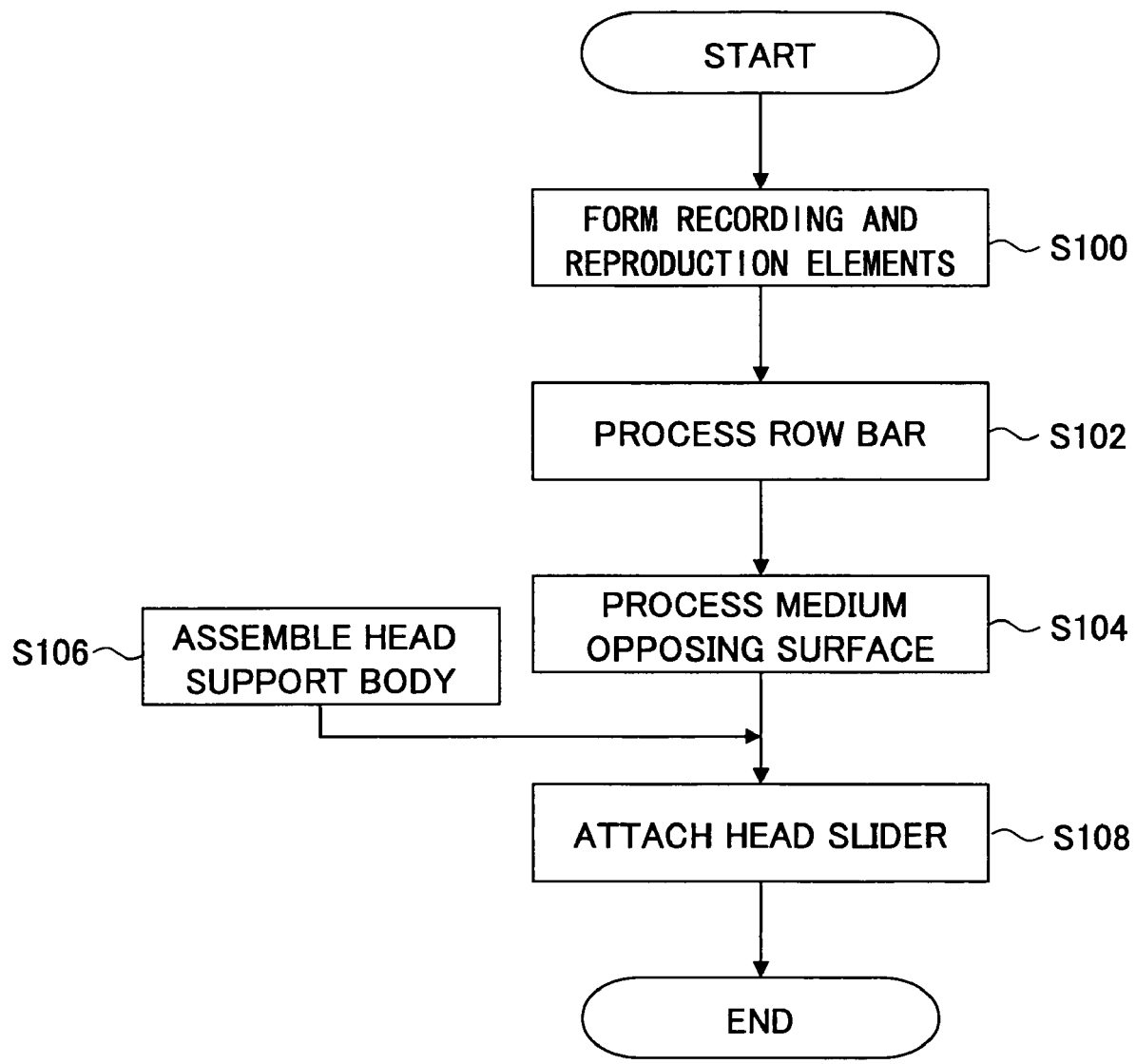

MAGNETIC HEAD INCLUDING BUFFER MEMBER ON GROOVE PART, METHOD OF MANUFACTURING SAME, AND MAGNETIC DISK UNIT INCLUDING SAME

BACKGROUND OF THE INVENTION

1. Field of the Invention

The present invention relates generally to magnetic heads, methods of manufacturing the same, and magnetic disk units, and more particularly to a magnetic head of low flying height, a method of manufacturing the same, and a magnetic disk unit using the same.

2. Description of the Related Art

In these years, increases in recording densities of magnetic disk units have made the distance (separation distance) between the head slider of a magnetic head and a magnetic disk at the time of recording and reproduction extremely small. This is because as a bit (the minimum unit of a magnetization area) formed in the magnetic disk becomes smaller in size, a signal magnetic field leaking from the bit decreases so that the spatial range of leakage of the signal magnetic field is narrowed. The distance between the head slider and the magnetic disk, or flying height, is 10 nm or less.

FIG. 1 is a schematic diagram showing a conventional magnetic head 200. Referring to FIG. 1, a head slider 201 of the magnetic head 200 has air bearing surfaces (ABSs) 202a and 202b forming air bearings, and a groove part 203 provided on its medium opposing surface, or the surface opposing a magnetic disk 210. The head slider 201 performs recording and reproducing in an element part 204 while maintaining an extremely low flying height, balancing using a pressure (lifting force) due to incoming airflow and a spring force from a flexure (not graphically illustrated) supporting the head slider 201.

In this condition of extremely low flying height, if there is a fine particle 215 on the surface of the magnetic disk 210, the ABSs 202a and 202b of the head slider 201 get on the particle 215, so that the head slider 201 is off balance to be displaced from the flying position. In this case, a protection film 205 such as a carbon film or a carbon hydride film is formed on each of the ABSs 202a and 202b, and a similar protection film 212 of a carbon film is also formed on the surface of the magnetic disk 210. Therefore, as is often the case, no damage is caused by the contact of the ABS 202a or 202b with the protection film 212 of the magnetic disk 210. Reference may be made to Japanese Laid-Open Patent Application No. 2002-133632 for related art.

As shown in FIG. 1, however, in the condition of extremely low flying height, the periphery of the head slider 201, for example, an air outgoing end 201TR of the groove part 203 indicated by the arrow, may come into contact with the surface of the protection film 212 of the magnetic disk 210 when the head slider 201 is off balance to be displaced from the flying position. Composite ceramic of aluminum oxide and titanium carbide is used for the head slider 201, and unevenness resulting from ceramic particles is formed on the surface of the head slider 201. This ceramic is harder than the carbon film. The ceramic is exposed in the groove part 203 of the head slider 201. Therefore, not only the protection film 212 is damaged but also even a recording layer 211 of the magnetic disk 210 may be damaged by the contact with the ceramic. This causes a so-called hard error, that is, error from which it is difficult to recover.

SUMMARY OF THE INVENTION

Embodiments of the present invention may solve or reduce one or more of the above-described disadvantages.

In a preferred embodiment of the present invention, there are provided a magnetic head in which the above-described disadvantages are eliminated and a magnetic disk unit including the magnetic head.

In a preferred embodiment of the present invention, there is provided a magnetic head in which an effect on the flight characteristics is reduced and which is capable of reducing the degree of damage caused to the surface of a magnetic disk even in the case of colliding with the disk surface.

According to one aspect of the present invention, there is provided a magnetic head including a head slider having a medium opposing surface to oppose a magnetic recording medium, the head slider being configured to fly by receiving airflow, caused by a movement of the magnetic recording medium, on the medium opposing surface, the medium opposing surface including an air bearing surface and a groove part, the groove part being lower than the air bearing surface; and a buffer member configured to prevent the magnetic recording medium from being damaged when the groove part comes into contact with the magnetic recording medium, the buffer member being provided on a part of a surface of the groove part in a peripheral part of the medium opposing surface.

According to one embodiment of the present invention, a buffer member is formed on the surface of a groove part lower than an air bearing surface in the peripheral part of a medium opposing surface, so that the peripheral part of the medium opposing surface comes into contact with the surface of a magnetic recording medium through the buffer member when a head slider happens to be off balance to be displaced from the flying position. Accordingly, it is possible to prevent the surface of the magnetic recording medium from being damaged.

According to another aspect of the present invention, there is provided a magnetic disk unit including a magnetic head according to one embodiment of the present invention; an actuator mechanism configured to support the magnetic head; and a magnetic recording medium on which recording and reproduction are performed by the magnetic head.

According to one embodiment of the present invention, it is possible to prevent the surface of a magnetic recording medium from being damaged even if a magnetic head comes into contact with the magnetic recording medium. Accordingly, it is possible to provide a highly reliable magnetic disk unit.

According to another aspect of the present invention, there is provided a method of manufacturing a magnetic head including a head slider having a medium opposing surface to oppose a magnetic recording medium, the head slider being configured to fly by receiving airflow, caused by a movement of the magnetic recording medium, on the medium opposing surface, the method including the step of (a) processing a predetermined surface of a base body having an element part formed therein into the medium opposing surface, the element part including at least one of a recording element and a reproduction element, wherein step (a) includes the steps of (b) forming a protection film covering at least the element part; (c) forming a groove part by grinding the protection film and a part of the base body; and (d) forming a buffer member in a part of the groove part to serve as a peripheral part of the medium opposing surface.

According to one embodiment of the present invention, first, a protection film covering at least an element part is formed so as to prevent the element part from being damaged by subsequent grinding, and a buffer member is selectively formed after forming a groove part. As a result, a magnetic head in which the buffer member reduces an effect on the flight characteristics of the magnetic head can be formed.

Thus, according to one embodiment of the present invention, it is possible to provide a magnetic head in which an adverse effect on its flying characteristic is reduced and which is capable of reducing the degree of damage caused to the surface of a magnetic disk in the case of colliding with the surface of the magnetic disk.

BRIEF DESCRIPTION OF THE DRAWINGS

Other objects, features and advantages of the present invention will become more apparent from the following detailed description when read in conjunction with the accompanying drawings, in which:

FIG. 4 is a perspective view of a head slider of the first example magnetic head according to the embodiment of the present invention;

FIG. 6 is a flowchart showing a manufacturing process of the first example magnetic head according to the embodiment of the present invention;

DETAILED DESCRIPTION OF THE PREFERRED EMBODIMENTS

A description is given below, with reference to the accompanying drawings, of an embodiment of the present invention.

Figure 1:
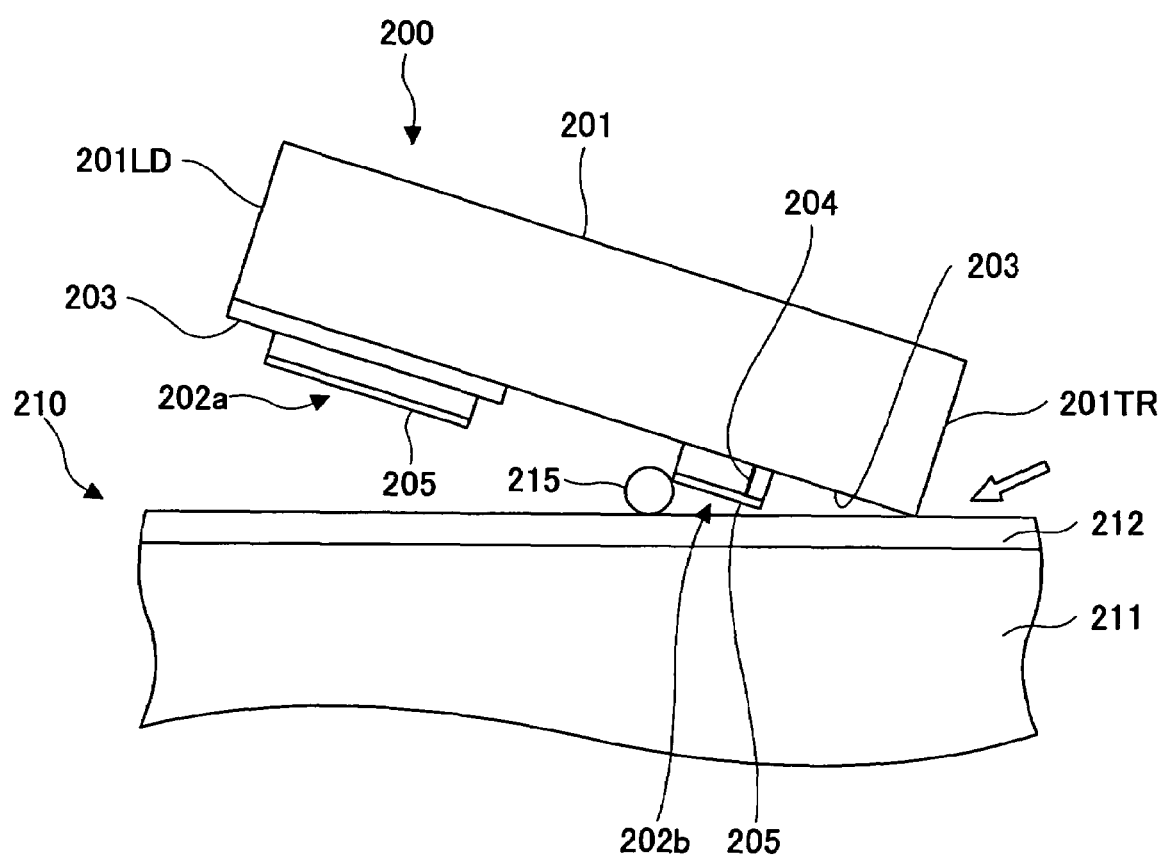
FIG. 1 is a diagram for illustrating problems of a conventional magnetic head.
Figure 2:
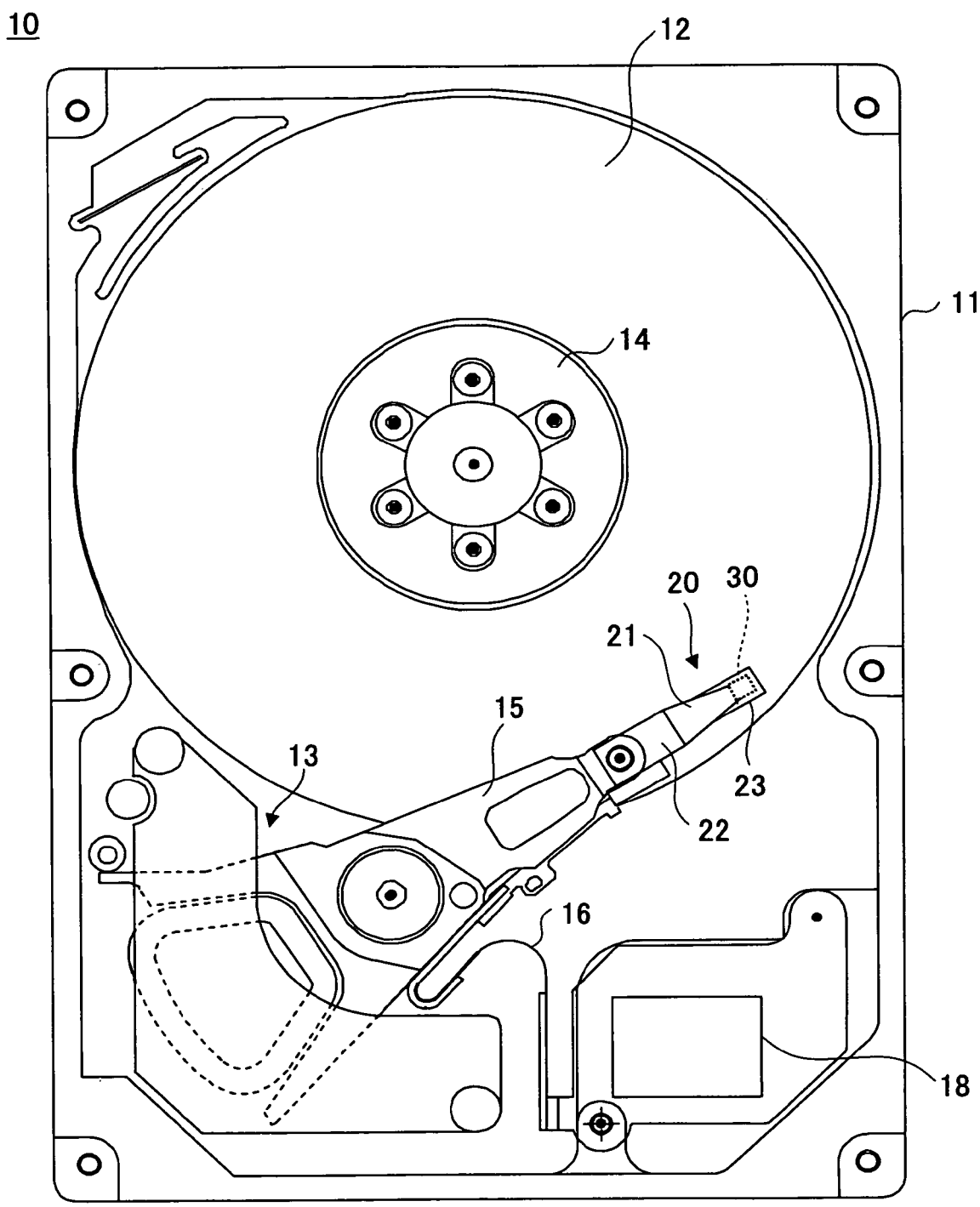
FIG. 2 is a plan view of a magnetic disk unit according to an embodiment of the present invention.

FIG. 2 is a plan view of part of a magnetic disk unit 10 according to the embodiment of the present invention.

Referring to FIG. 2, the magnetic disk unit 10 includes a housing 11, a magnetic disk 12, a magnetic head 20, and an actuator unit 13. The magnetic disk 12, the magnetic head 20, and the actuator unit 13 are housed in the housing 11. The magnetic disk 12 is fixed to a hub 14, and is rotated by a spindle motor (not graphically illustrated). The magnetic head 20 is rotationally moved by the actuator unit 13 through an arm 15 in the radial directions of the magnetic disk 12.

The magnetic disk 12 has a configuration where a recording layer and a protection film, neither of which is graphically illustrated, are deposited in this order on a disk-shaped substrate. The protection film is formed of a carbon film such as an amorphous carbon film or a diamond-like carbon film. It is possible to employ so-called longitudinal magnetic recording media and perpendicular magnetic recording media as the magnetic disk 12. The magnetic disk 12 may have any known configuration as long as recording and reproduction are performable thereon by the magnetic head 20.

An R/W amplifier 18 that outputs a recording current to and to which a reproduction signal is input from the magnetic head 20 through an FPC (flexible printed circuit) 16 is provided in the housing 11. The R/W amplifier 18 is connected to an electronic board (not graphically illustrated) provided on the other side of the housing 11. A recording and reproduction controller circuit, a magnetic head position controller circuit, and a spindle motor controller circuit, none of which is graphically illustrated, are provided on the electronic board. A detailed description is given below of the magnetic head 20.

Figure 3:
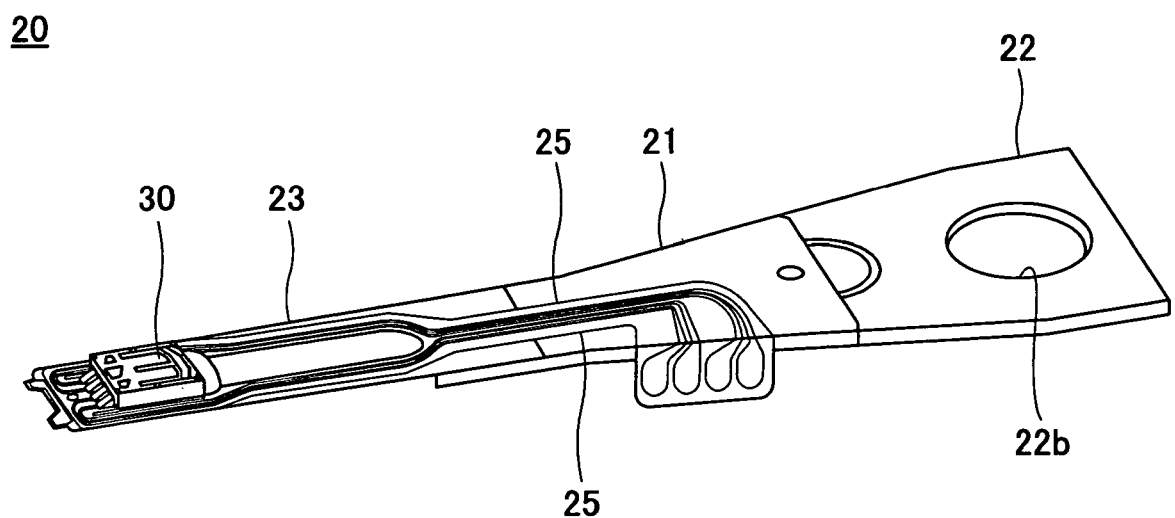
FIG. 3 is a plan view of a first example magnetic head taken from the medium opposing surface side according to the embodiment of the present invention.

FIG. 3 is a plan view of the magnetic head 20, which is a first example magnetic head according to the embodiment, taken from its medium opposing surface side. Referring to FIG. 3, the magnetic head 20 includes a head support body, a head slider 30, and a signal interconnection part 25. The head support body includes a load beam 21, a base plate 22, and a flexure 23.

The base plate 22 is fitted to the base of the load beam 21 so as to be integrated therewith. As a result, the load beam 21 is fixed to the arm 15 shown in FIG. 2 through an opening 22b of the base plate 22. Further, the flexure 23 is fitted and fixed to the center through the end part of the load beam 21 so as to be supported by the load beam 21.

The flexure 23, for which a metal thin film of stainless steel or the like is used, has the function of a leaf spring. The end part of the flexure 23 is a free end with the part of the flexure 23 fixed to the load beam 21 serving as a fulcrum. The head slider 30 is fixed to the end part of the flexure 23.

Figure 5A:
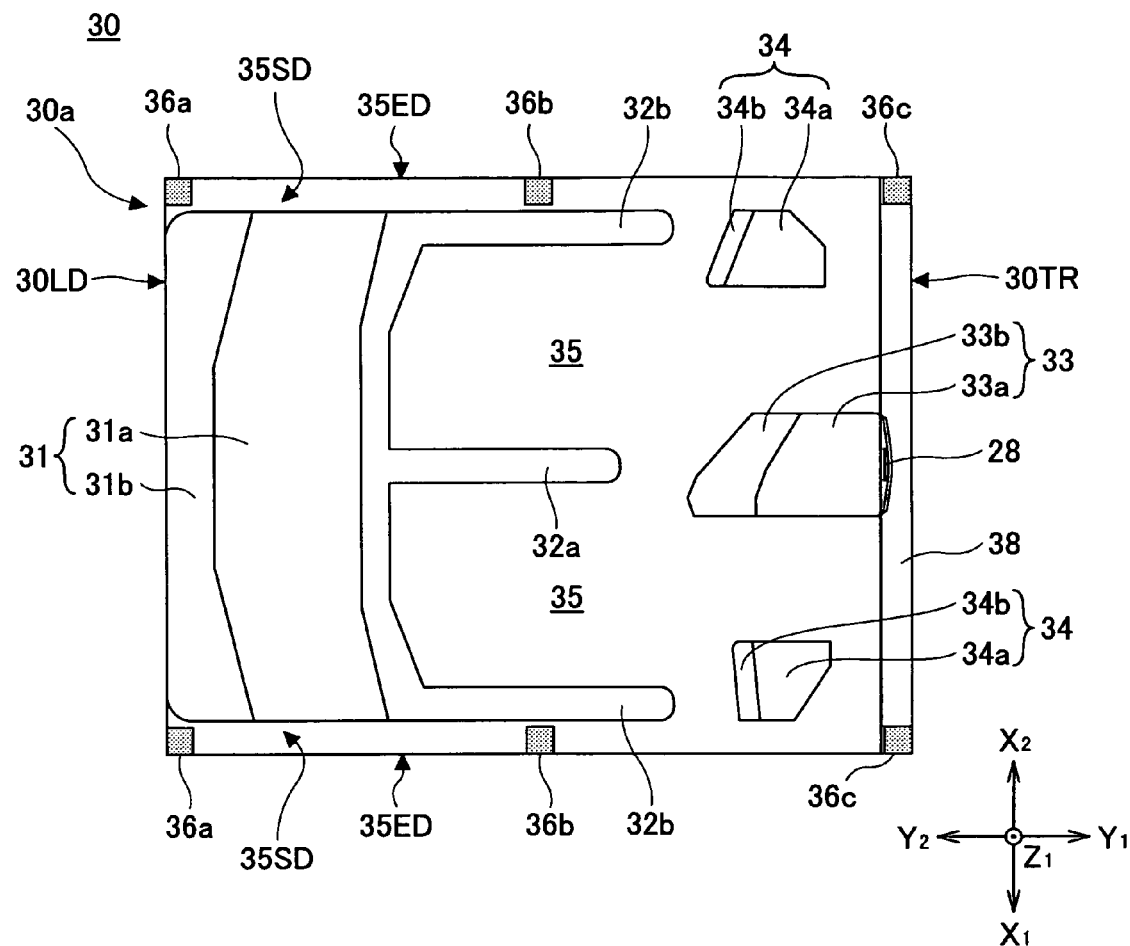
FIG. 5A is a plan view of a medium opposing surface of the head slider of FIG. 4.

FIG. 4 is a perspective view of the head slider 30 of the magnetic head 20. FIG. 5A is a plan view of a medium opposing surface 30a of the head slider 30, and FIG. 5B is a side view of the head slider 30.

Figure 5B:
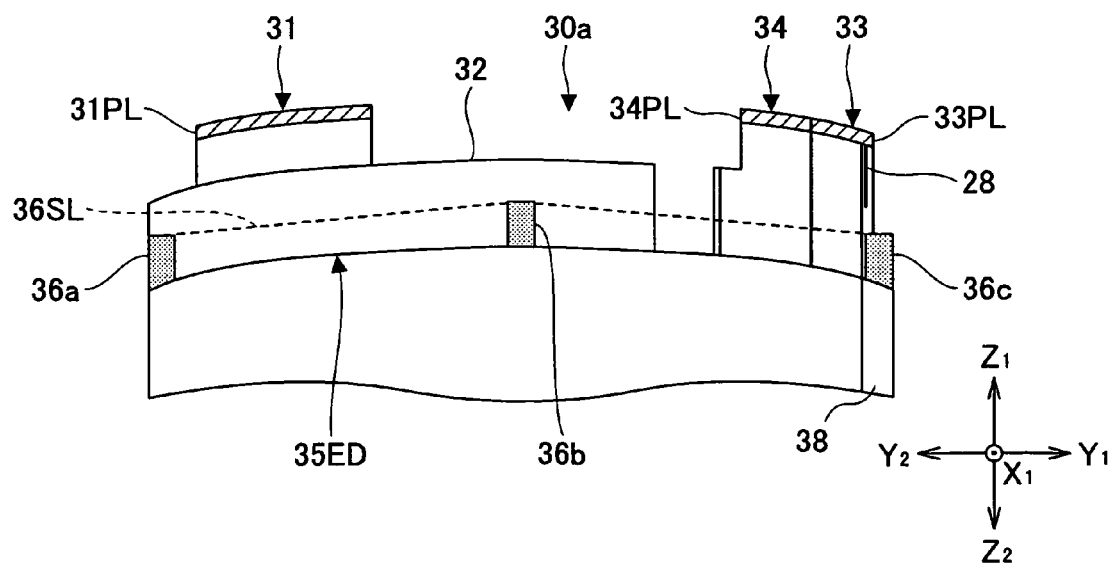
FIG. 5B is a side view of the head slider of FIG. 4 according to the embodiment of the present invention.

Referring to FIGS. 4, 5A, and 5B, the head slider 30 of the magnetic head 20 has a rectangular parallelepiped shape, and its base material is a ceramic material such as $Al_2O_3$—TiC. Further, the head slider 30 has a protection film 38 such as an alumina film of tens of μm in thickness formed on the air outgoing end 30TR side.

The head slider 30 has a front rail 31 formed on the air incoming end 30LD side on the medium opposing surface 30a. A center rail 32a is formed in the width-directional center part of the front rail 31. A side rail 32b is formed at each width-directional side of the front rail 31. Further, a rear center rail 33 is formed on the medium opposing surface 30a in its substantial width-directional center on the air outgoing end 30TR side. Further, a rear side rail 34 is formed on each width-directional side of the rear center rail 33 on the medium opposing surface 30a. Here, the width refers to an $X_1$-$X_2$ dimension.

The front rail 31 includes an air bearing surface 31a that extends widthwise and a step surface 31b. There is a step between the air bearing surface 31a and the step surface 31b so that the step surface 31b is lower than the air bearing surface 31a when the head slider 30 is oriented with the medium opposing surface 30a side up. The step surface 31b is formed on the air incoming end 30LD side and the air outgoing end 30TR side of the air bearing surface 31a.

The center rail 32a and the side rails 32b are formed on a level with the step surface 31b of the front rail 31.

The rear center rail 33 is formed in the substantial width-directional center on the air outgoing end 30TR side. The rear center rail 33 includes an air bearing surface 33a and a step surface 33b. The step surface 33b is lower than the air bearing surface 33a by a predetermined step. The step surface 33b is formed widthwise on the air incoming end 30LD side of the air bearing surface 33a.

Further, the rear center rail 33 has an element part 28 formed thereon on the air outgoing end 30TR side of the air bearing surface 33a. The element part 28 includes a reproduction element and a recording element in layers. For example, a spin-valve magnetoresistive (MR) element, a ferromagnetic tunnel junction MR (TMR) element, and a ballistic MR element are employable as the reproduction element. For example, a thin film induction-type recording element (a ring-type head or a magnetic monopole head for perpendicular magnetic recording) is employable as the recording element.

Each rear side rail 34 includes an air bearing surface 34a and a step surface 34b. The step surface 34b is lower than the air bearing surface 34a by a predetermined step.

The medium opposing surface 30a is highest at the air bearing surfaces 31a, 33a, and 34a, whose shapes and dimensions are suitably determined by parameters of flight design, such as the amount of flying (flying height) and a flying position roll angle. Protection films 31PL, 33PL, and 34PL are formed on the air bearing surfaces 31a, 33a, and 34a, respectively. It is not always necessary to form protection films on all the air bearing surfaces 31a, 33a, and 34a. However, a protection film should be provided on at least the surface of the element part 28 of the air bearing surface 33a. Each of the protection films 31PL, 33PL, and 34PL is formed of a carbon film such as an amorphous carbon film or a diamond-like carbon film.

A groove part 35 is formed on the air outgoing end 30TR side of the front rail 31, on the width-directional outer sides of the front rail 31 and the side rails 32b, and around the rear center rail 33 and the side rails 34. The groove part 35 is formed to be deeper (lower) than the step surfaces 31b, 33b, and 34b, the center rail 32a, and the side rails 32b. For example, the groove part 35 is formed with a depth of approximately 2-3 μm from the air bearing surface 31a.

Next, a description is given of the flight mechanism of the head slider 30. The basic flight mechanism is as follows. First, when the magnetic disk 12 shown in FIG. 2 rotates, airflow is generated along the surface of the magnetic disk 12. The airflow collides with the respective sidewalls formed by the step surfaces 31b, 33b, and 34b of the head slider 30 and the corresponding air bearing surfaces 31a, 33a, and 34a on the downstream side. The collision compresses the airflow so as to increase its pressure. The airflow exerts pressure on the air bearing surfaces 31a, 33a, and 34a, thereby generating buoyancy.

On the other hand, airflow passing through the air bearing surfaces 31a, 33a, and 34a has its pressure reduced by the groove part 35, so that negative pressure is generated to generate a force toward the surface of the magnetic disk 12 (=a force opposite in direction from the buoyancy). The balance of force achieved by these forces and the flexure 23 shown in FIG. 3 causes the head slider 30 to fly with a desired amount of flying and flying position (attitude).

The negative pressure generated in the groove part 35 is determined by the depth and area of the groove part 35 relative to the air bearing surfaces 31a, 33a, and 34a. It is preferable to control the negative pressure in order to ensure the flight stability of the head slider 30 with a flying height of, for example, 10 nm or less. It is a portion of the groove part 35 on the air outgoing end 30TR side of the front rail 31 that particularly affects flight characteristics. It is preferable to control the depth of this portion of the groove part 35 with accuracy.

According to the magnetic head 20, buffer pads 36a, 36b, and 36c are provided on the surfaces of both width-directional side edge parts 35SD of the groove part 35 on the medium opposing surface 30a. Hereinafter, the buffer pads 36a, 36b, and 36c are referred to by reference numeral 36 unless otherwise noted. The buffer pads 36 are provided at the air incoming end 30LD, at the air outgoing end 30TR, and in the vicinity of the midpoint between the air incoming end 30LD and the air outgoing end 30TR. Each buffer pad 36 is formed of a carbon film such as an amorphous carbon film or a diamond-like carbon film. A ceramic material such as $Al_2O_3$—TiC, which is the base material of the head slider 30, is exposed on the surface of each side edge part 35SD. However, since the buffer pads 36 are provided on the surfaces of the side edge parts 35SD, the side edge parts 35SD are prevented from coming into direct contact with the surface of the magnetic disk 12 when the head slider 30 is off balance to be displaced from the flying position so that both side edges of the medium opposing surface 30a move up and down.

Each buffer pad 36 has a parallelepiped shape. The width ($X_1$-$X_2$ dimension) and the length ($Y_1$-$Y_2$ dimension) of the buffer pad 36 are, for example, 5 μm to 20 μm. However, the buffer pads 36 are not limited in size and shape in particular. It is preferable that one side of each buffer pad 36 be in contact with a corresponding side end part 35ED of the groove part 35.

It is preferable that each buffer pad 36 have a thickness of 3 nm or more. If the buffer pad 36 is thinner than 3 nm, the buffer effect is reduced so as to cause damage to the surface of the magnetic disk 12. Further, it is preferable that the buffer pads 36 be prevented from projecting from the level of the air bearing surfaces 31a, 33a, and 34a. As an alternative configuration, it is possible to provide only the buffer pads 36a and 36c at the air incoming end 30LD and the air outgoing end 30TR, respectively. By suitably selecting the height of the buffer pads 36a and the height of the buffer pads 36c, it is possible to prevent the side edge parts 35SD from coming into direct contact with the surface of the magnetic disk 12.

Further, as shown in FIG. 5B, the height of each buffer pad 36 is determined so that an imaginary line 36SL connecting the surfaces of the buffer pads 36a, 36b, and 36c successively with straight lines is outside (or above in the graphical representation of FIG. 5B) the side edge part 35SD, particularly the side end part 35ED, of the groove part 35. In order to ensure flight stability, the head slider 30 is shaped so that the medium opposing surface 30a convexly warps outward along the direction from the air incoming end 30LD to the air outgoing end 30TR (airflow direction). In this case, each side end part 35ED of the head slider 30 is shaped so as to have a rise around its center. However, by determining the height of each buffer pad 36 so that the imaginary line 36SL is outside the side end part 35ED, the side end part 35ED of the groove part 35 is prevented, with more certainty, from coming into direct contact with the surface of the magnetic disk 12.

Further, the buffer pads 36 are provided on the width-directional outer sides of the front rail 31, the side rails 32b, and the rear side rails 34. Therefore, the buffer pads 36 hardly affect flight characteristics. Accordingly, the buffer pads 36 can prevent the base material of the head slider 30 from coming into direct contact with the surface of the magnetic disk 12 without adversely affecting flight characteristics. As described above, according to the magnetic head 20, the buffer pads 36 are provided on the surface of the side edge part 35SD of the groove part 35 on each of the width-directional outer sides of the front rail 31, the side rails 32b, and the rear side rails 34 on the medium opposing surface 30a. Therefore, when the head slider 30 is off balance to be displaced from the flying position, the side edge parts 35SD, particularly the side end parts 35ED, of the groove part 35 come into indirect contact with the surface of the magnetic disk 12 through the buffer pads 36. Accordingly, it is possible to prevent the base material of the head slider 30 from coming into direct contact with the surface of the magnetic disk 12. Thus, the magnetic head 20 can avoid damaging the surface of the magnetic disk 12 in such a case.

Figure 7:
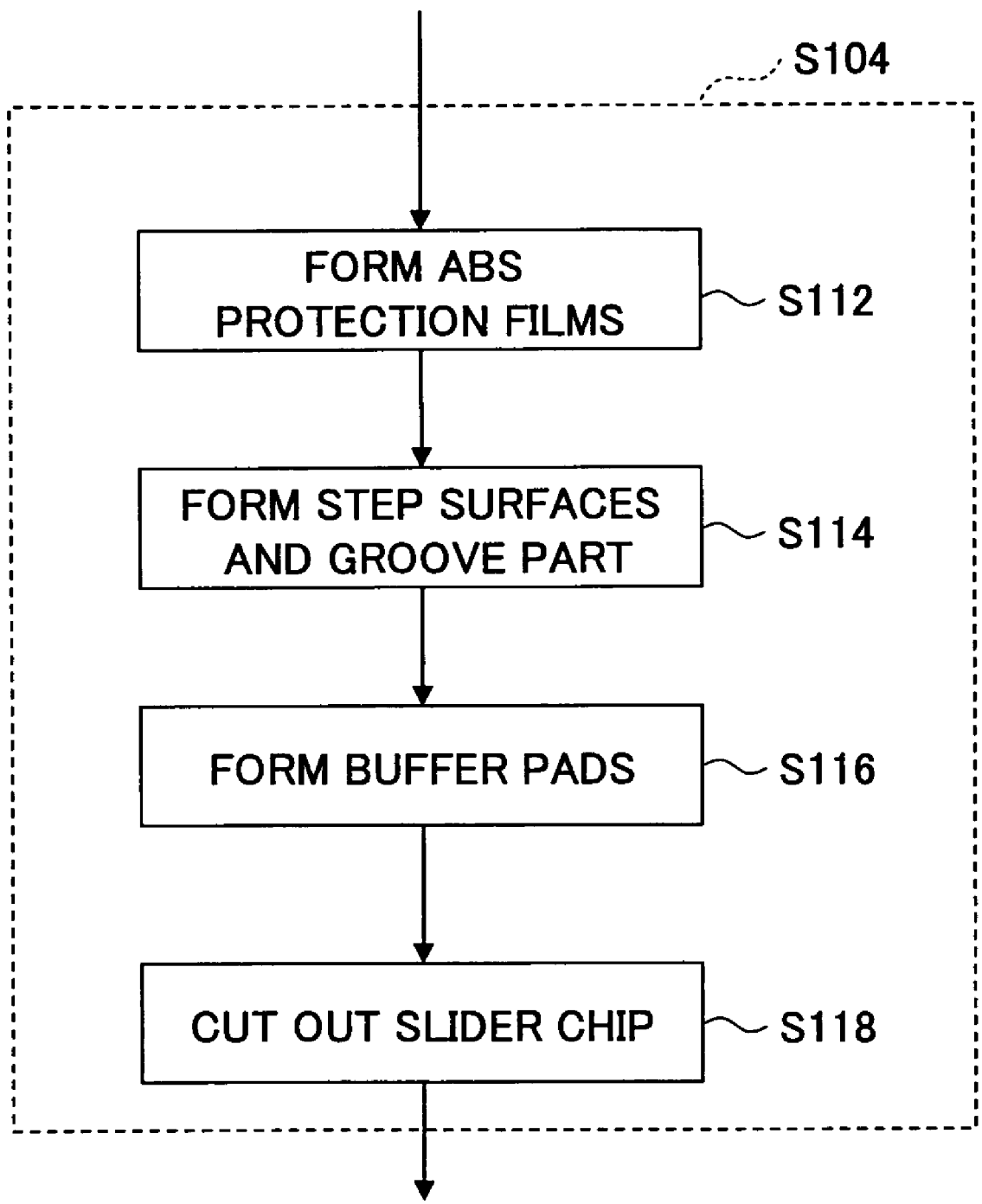
FIG. 7 is another flowchart showing the manufacturing process of the first example magnetic head according to the embodiment of the present invention.

Next, a description is given, with reference to FIGS. 6 and 7, of a method of manufacturing the magnetic head 20 according to this embodiment.

FIG. 6 is a flowchart showing a method of manufacturing the magnetic head 20.

First, in step S100, element parts are formed by successively stacking a reproduction element and a recording element on a wafer formed of a ceramic material of $Al_2O_3$—TiC. This process is performed by the same process as a semiconductor process, and the element parts are disposed in a matrix-like manner on the wafer.

Next, in step S102, the wafer is cut into row bars in each of which element parts are disposed in a row. The row bar is formed of multiple head sliders arranged successively in their width direction. One side of the row bar serves as a medium opposing surface, and the other side of the row bar serves as a surface to be fixed to a flexure. The medium opposing surface is a side on which the magnetic poles of the recording element and the reproduction element are exposed.

Next, in step S104, the medium opposing surface of the row bar is processed. A detailed description of processing of the medium opposing surface is given below.

On the other hand, in step S106, a head support body is assembled in another process. Specifically, the load beam 21, the base plate 22, and the flexure 23 as shown in FIG. 3 are formed by etching or punching. The signal interconnection part 25 is formed at the same time that the flexure 23 is formed. Then, these components are assembled into the head support body.

Next, in step S108, a head slider is attached to the head support body, and the signal interconnection part 25 is electrically connected to the electrodes (not graphically illustrated) of the head slider. Thereby, the magnetic head 20 is formed.

Next, a description is given, with reference to FIGS. 5A, 5B, and 7, of the process of processing the medium opposing surface of step S104. First, in step S112, the carbon films 31PL, 33PL, and 34PL serving as the protection films of the air bearing surfaces 31a, 33a, and 34a are formed on the surface of the row bar. Specifically, a carbon film of, for example, 5 nm in thickness is formed by CVD, sputtering, or FCA (Filtered Cathode-Arc).

Next, in step S114, the step surfaces 31b, 33b, and 34b and the groove part 35 are formed. Specifically, a resist film having an opening that exposes an area to serve as the step surfaces 31b, 33b, and 34b and the groove part 35 is formed on the surface of the carbon film by photolithography. This resist film is formed so as to cover the air bearing surface 31a of the front rail 31 and the surface of the element part 28. Further, using the resist film as a mask, the carbon film and the surface of the row bar are ground by RIE to the depth of the step surfaces 31b, 33b, and 34b.

Next, a resist film having an opening that exposes an area to serve as the groove part 35 is formed. Further, using the resist film as a mask, the surface of the row bar is ground by RIE to the depth of the groove part 35. Then, the resist film is removed. Thereby, the step surfaces 31b, 33b, and 34b and the groove part 35 are formed.

Next, in step S116, the buffer pads 36 are formed. Specifically, a resist film having an opening that exposes an area to serve as the buffer pads 36 is formed on the surface to serve as the medium opposing surface 30a. Further, using the resist film as a mask, a carbon film is deposited by CVD, sputtering, or FCA. Further, the resist film is removed. Thereby, the medium opposing surface 30a is formed.

Next, in step S118, the chip of the head slider 30 is cut from the row bar. Thereby, the head slider 30 is formed.

According to this manufacturing method, the buffer pads 36 are formed after forming the air bearing surfaces 31a, 33a, and 34a, the step surfaces 31b, 33b, and 34b, and the groove part 35. Therefore, the buffer pads 36 can be formed with optimum material and thickness therefor. Further, since the buffer pads 36 are formed without removing the protection film covering the element part 28, it is possible to avoid damaging the element part 28.

Next, a description is given of a second example magnetic head according to this embodiment. The second example magnetic head includes a head slider 40, which is a variation of the head slider 30 of the magnetic head 20 shown in FIGS. 3 through 5B. The head slider 40 has the same configuration as the head slider 30 except for the buffer pad configuration of the medium opposing surface. Each of the second through seventh example magnetic heads described below has the same configuration as the first example magnetic head 20 except for the head slider. Accordingly, graphical representation of the entire magnetic head is omitted.

Figure 8:
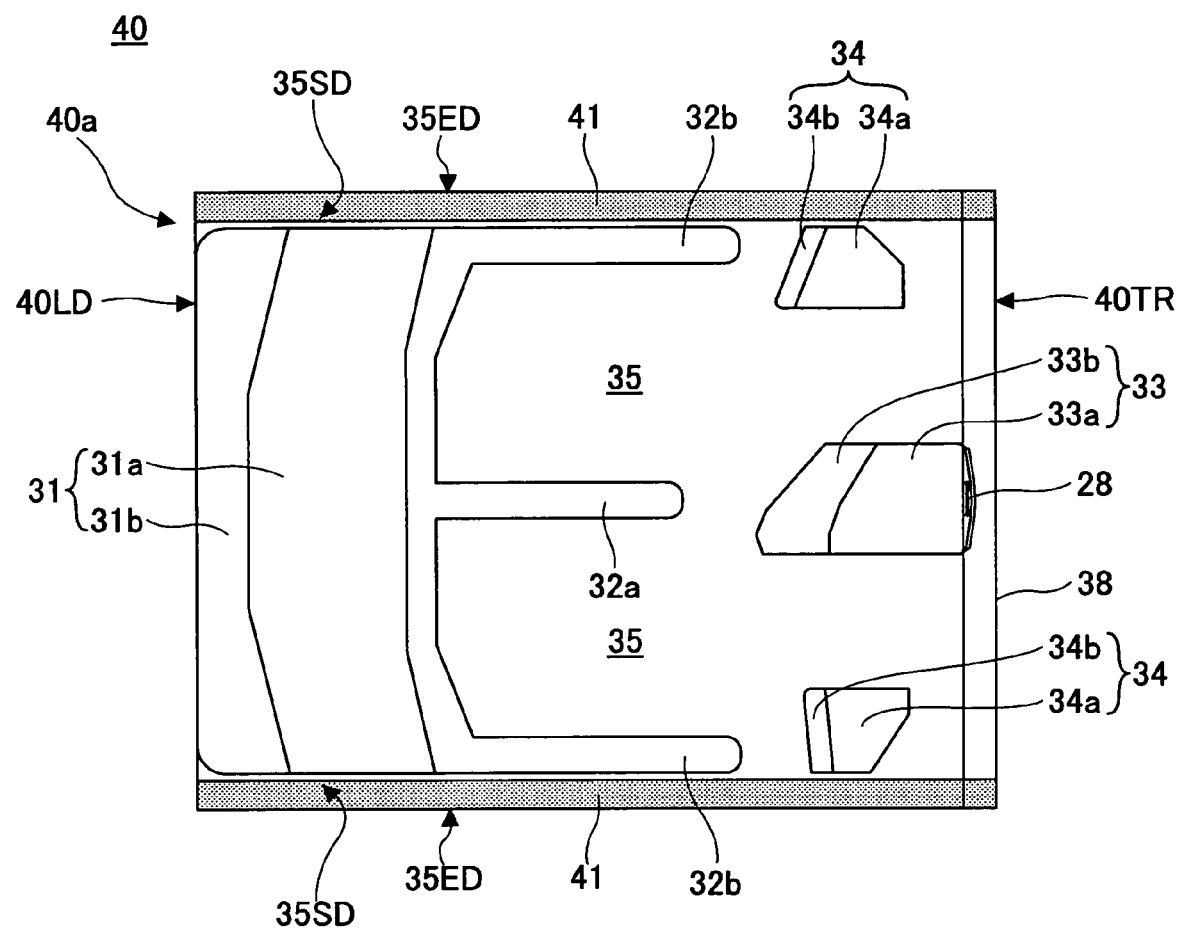
FIG. 8 is a plan view of a medium opposing surface of a head slider of a second example magnetic head according to the embodiment of the present invention.

FIG. 8 is a plan view of a medium opposing surface 40a of the head slider 40 of the second example magnetic head according to this embodiment. In FIG. 8, the elements corresponding to those described above are referred to by the same numerals, and a description thereof is omitted.

Referring to FIG. 8, according to the second example magnetic head, a buffer pad 41 is provided on the surface of each of the side edge parts 35SD of the groove part 35 on both width-directional sides on the medium opposing surface 40a of the head slider 40. Each buffer pad 41 is formed continuously from an air incoming end 40LD to an air outgoing end 40TR along the corresponding side edge part 35SD. The material and film thickness of the buffer pads 41 are selected from the same ranges as those of the buffer pads 36 of the magnetic head 20. Further, the buffer pads 41 are manufactured in the same manner as the buffer pads 36. Accordingly, a description thereof is omitted. Each buffer pad 41 has a width of, for example, approximately 15 μm. It is preferable that each buffer pad 41 be in contact with the corresponding side end part 35ED of the groove part 35.

The buffer pads 41 of the second example magnetic head produce the same effects as those of the buffer pads 36 of the magnetic head 20 shown in FIGS. 4 through 5B. Further, according to the second example magnetic head, each buffer pad 41 is formed continuously from the air incoming end 40LD to the air outgoing end 40TR. Therefore, when the head slider 40 is off balance to be displaced from the flying position, the buffer pads 41 come into contact with the surface of the magnetic disk 12. Accordingly, it is possible to ensure that the base material of the side end parts 35ED of the groove part 35 is prevented from coming into direct contact with the surface of the magnetic disk 12 irrespective of the shape of the side end parts 35ED. Further, it is possible to suitably determine the film thickness of the buffer pads 41 irrespective of the shape of the side end parts 35ED. Accordingly, it is possible to reduce the film thickness of the buffer pads 41. Therefore, the buffer pads 41 can further reduce the effect on flight characteristics.

Next, a description is given of a third example magnetic head according to this embodiment. The third example magnetic head is a variation of the magnetic head 20 shown in FIGS. 3 through 5B. The third example magnetic head has the same configuration as the magnetic head 20 except for the buffer pad configuration of the medium opposing surface of the head slider.

Figure 9A:
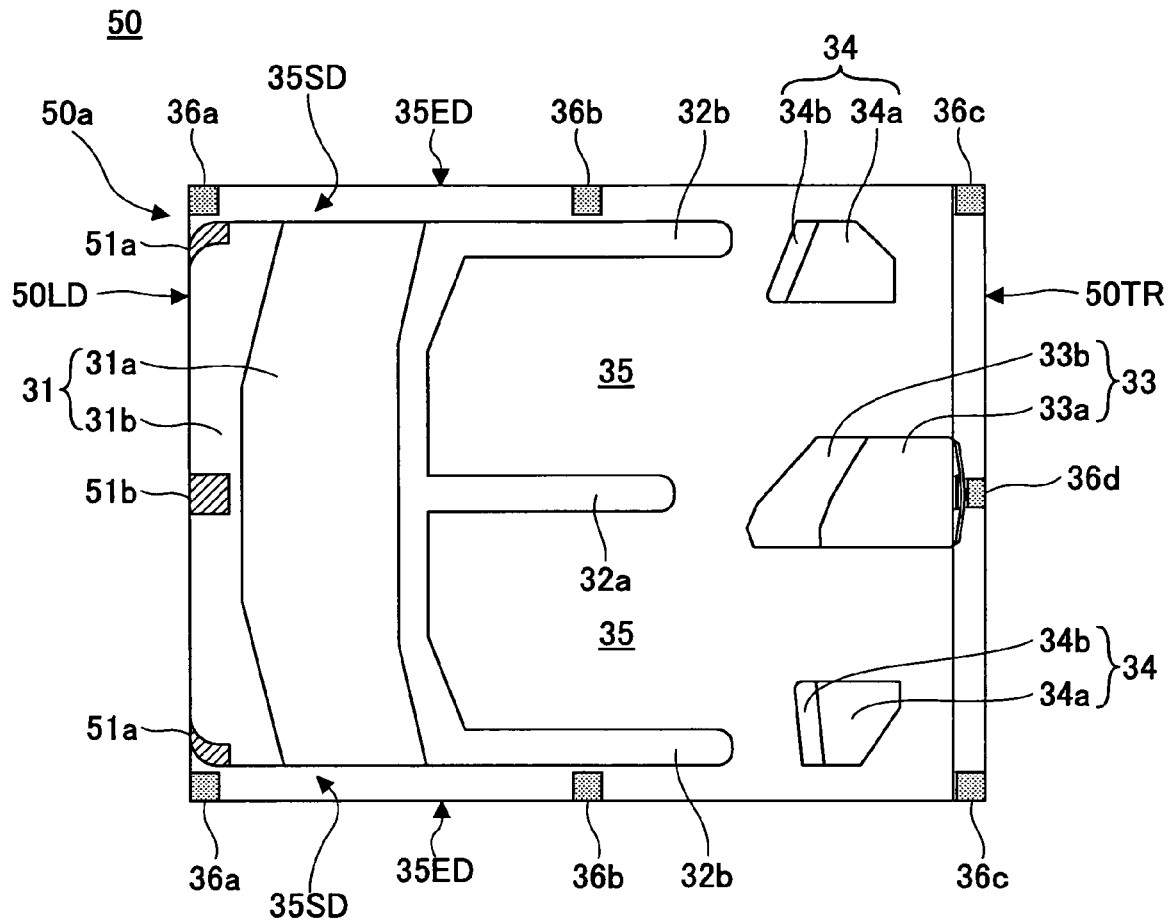
FIG. 9A is a plan view of a medium opposing surface of a head slider of a third example magnetic head.
Figure 9B:
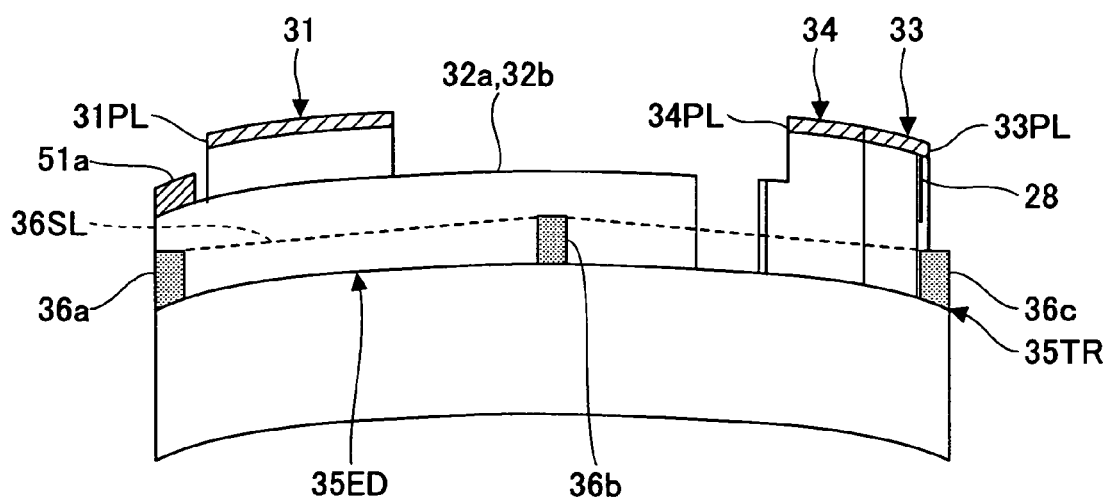
FIG. 9B is a side view of the head slider of the third example magnetic head according to the embodiment of the present invention.
Figure 10:
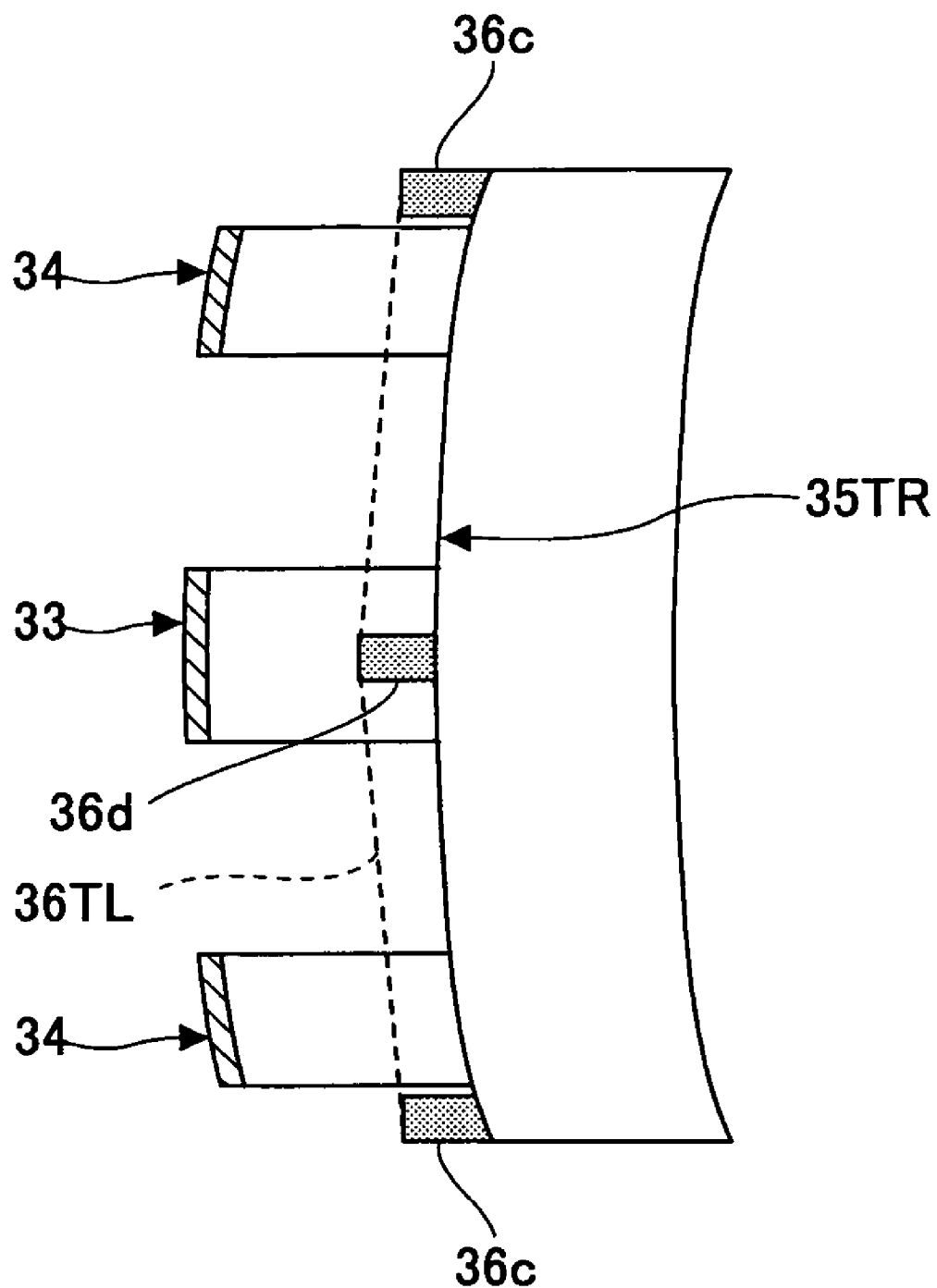
FIG. 10 is an end view of the head slider of the third example magnetic head taken from the air outgoing end side according to the embodiment of the present invention.

FIG. 9A is a plan view of a medium opposing surface 50a of a head slider 50 of the third example magnetic head. FIG. 9B is a side view of the head slider 50. FIG. 10 is an end view of the head slider 50 taken from the side of an air outgoing end 50TR thereof. In FIGS. 9A through 10, the elements corresponding to those described above are referred to by the same numerals, and a description thereof is omitted.

Referring to FIGS. 9A, 9B, and 10, according to the third example magnetic head, the buffer pads 36a, 36b, and 36c are provided on the surfaces of both side edge parts 35SD of the groove part 35 on both width-directional sides on the medium opposing surface 50a of the head slider 50. As described above with reference to FIG. 5B, the height of each of the buffer pads 36a, 36b, and 36c is determined so that the imaginary line 36SL connecting the surfaces of the buffer pads 36a, 36b, and 36c successively with straight lines is outside the side end part 35ED of the groove part 35. By thus determining the height of each buffer pad 36, it is possible to prevent each side end part 35SD of the groove part 35 from coming into direct contact with the surface of the magnetic disk 12 with more certainty.

Further, the head slider 50 has a buffer pad 51a provided on each width-directional side and a buffer pad 51b provided in the width-directional center on the step surface 31b of the front rail 31 of the medium opposing surface 50a. The buffer pads 51a and 51b are formed of the same material as the buffer pads 36. The thickness of each of the buffer pads 51a and 51b is within the range of 5 nm to 50 nm. As a result, when the head slider 50 happens to come into contact with the surface of the magnetic disk 12 on its air incoming end 50LD side, the buffer pads 51a and 51b come into contact with the surface of the magnetic disk 12, thereby preventing the ceramic material, which is the base material of the head slider 50, from directly contacting and damaging the surface of the magnetic disk 12.

Further, as shown in FIG. 10, the head slider 50 has a buffer pad 36d provided in the width-directional center of the surface of the groove part 35 on the air outgoing end 50TR side of the rear center rail 33 of the medium opposing surface 50a. The buffer pad 36d is formed of the same material as the buffer pads 36. The film thickness of the buffer pad 36d is within the same range as the buffer pads 36.

Further, as shown in FIG. 10, the height of each of the buffer pads 36c and 36d at the air outgoing end 50TR of the head slider 50 is determined so that an imaginary line 36TL connecting the surfaces of the buffer pads 36c, 36d, and 36c in this order with straight lines is outside (or in the graphical representation of FIG. 10, on the left side of) an air outgoing end 35TR of the groove part 35. In order to ensure flight stability, the head slider 50 is shaped so that the medium opposing surface 50a convexly warps outward along the width direction. In this case, the air outgoing end 35TR of the groove part 35 is shaped so as to have a rise around its center. However, by determining the height of each of the buffer pads 36c and 36d so that the imaginary line 36TL is outside the air outgoing end 35TR, it is ensured that the air outgoing end 35TR of the groove part 35 is prevented from coming into direct contact with the surface of the magnetic disk 12.

Further, the same applies to the buffer pads 51a and 51b on the step surface 31b at the air incoming end 50LD. Although not graphically illustrated, the height of each of the buffer pads 51a and 51b is determined so that an imaginary line connecting the surfaces of the buffer pads 51a, 51b, and 51a in this order with straight lines is outside the air incoming end of the step surface 31b.

The third example magnetic head produces the same effects as the magnetic head 20. Further, according to the third example magnetic head, the head slider 50 has the buffer pads 51a and 51b provided on the step surface 31b on the air incoming end 50LD side, and has the buffer pad 36d provided in the width-directional center of the surface of the groove part 35 on the air outgoing end 50TR side. Accordingly, when the head slider 50 is off balance to be displaced from the flying position, the air incoming end 50LD and the air outgoing end 50TR come into contact with the surface of the magnetic disk 12 through the buffer pads 51a, 51b, 36c, and 36d. Accordingly, the base material of the head slider 50 is prevented from directly contacting and damaging the surface of the magnetic disk 12.

Next, a description is given of a fourth example magnetic head according to this embodiment. The fourth example magnetic head is a variation of the third example magnetic head shown in FIGS. 9A through 10. The fourth example magnetic head has the same configuration as the third example magnetic head except for the buffer pad configuration of the medium opposing surface of the head slider.

Figure 11:
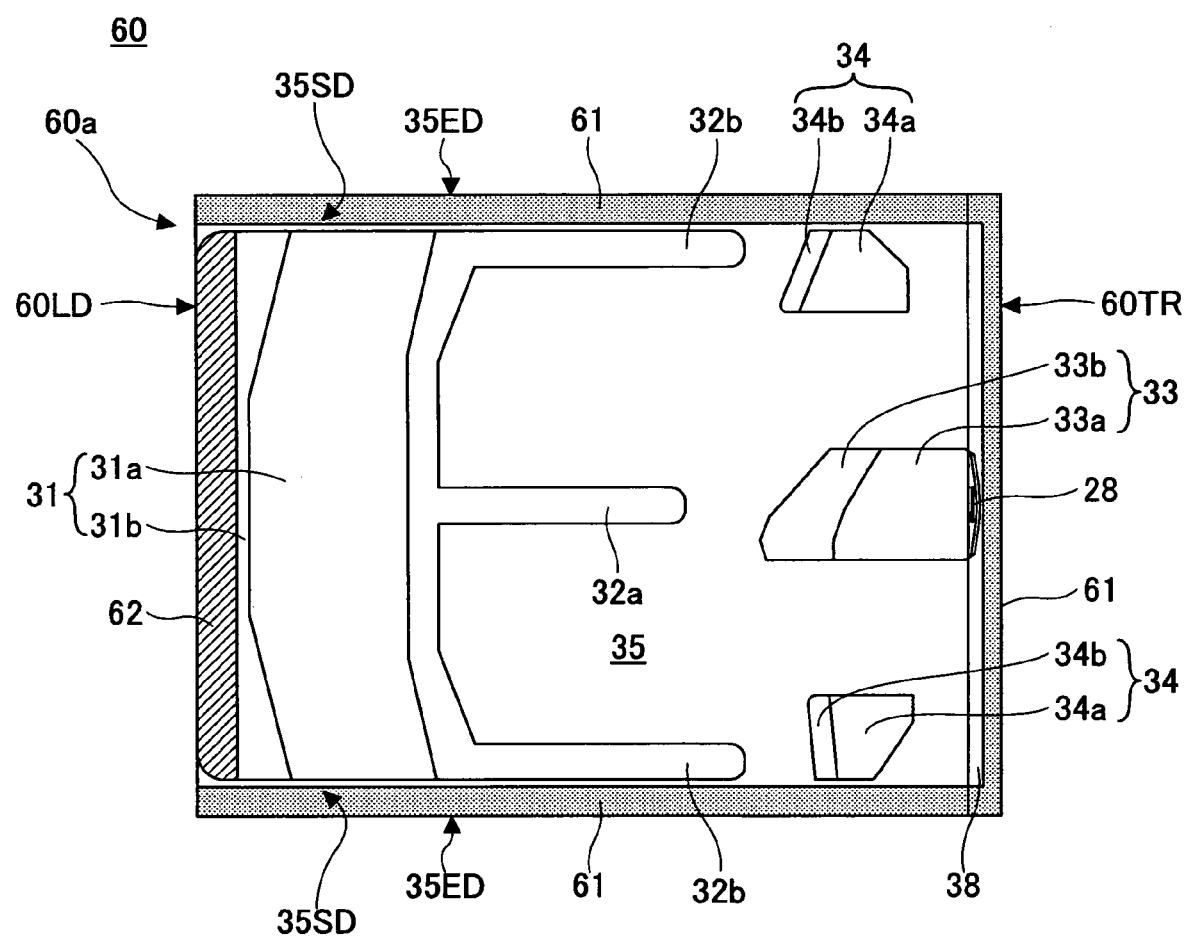
FIG. 11 is a plan view of a medium opposing surface of a head slider of a fourth example magnetic head according to the embodiment of the present invention.

FIG. 11 is a plan view of a medium opposing surface 60a of a head slider 60 of the fourth example magnetic head. In FIG. 11, the elements corresponding to those described above are referred to by the same numerals, and a description thereof is omitted.

Referring to FIG. 11, according to the fourth example magnetic head, the head slider 60 has a buffer pad 61 provided on the surface of each of the side edge parts 35SD of the groove part 35 on both width-directional sides on the medium opposing surface. The buffer pad 61 is formed continuously along the airflow direction on each side edge part 35SD, and is further formed continuously widthwise at an air outgoing end 60TR.

Further, the head slider 60 has a buffer pad 62 provided on the step surface 31b of the front rail 31 on the medium opposing surface 60a. The buffer pad 62 is formed widthwise along an air incoming end 60LD. The material and film thickness of each of the buffer pads 61 and 62 are within the same ranges as those of the buffer pads 36 of the first example shown in FIGS. 4 through 5B.

The fourth example magnetic head produces the same effects as the first example magnetic head 20. Further, according to the fourth example magnetic head, the buffer pads 61 and 62 are formed on the peripheral part of the medium opposing surface 60*a* so as to surround the front rail 31, the center rail 32*a*, the side rails 32*b*, the rear center rail 33, and the rear side rails 34. Accordingly, even if the head slider 60 happens to be inclined in any direction, the head slider 60 comes into contact with the surface of the magnetic disk 12 through the buffer pads 61 and 62. Accordingly, the base material of the head slider 60 is prevented from directly contacting and damaging the surface of the magnetic disk 12.

Next, a description is given of a fifth example magnetic head according to this embodiment. The fifth example magnetic head is a variation of the fourth example magnetic head shown in FIG. 11. The fifth example magnetic head has the same configuration as the fourth example magnetic head except for the buffer pad configuration of the medium opposing surface of the head slider.

Figure 12:
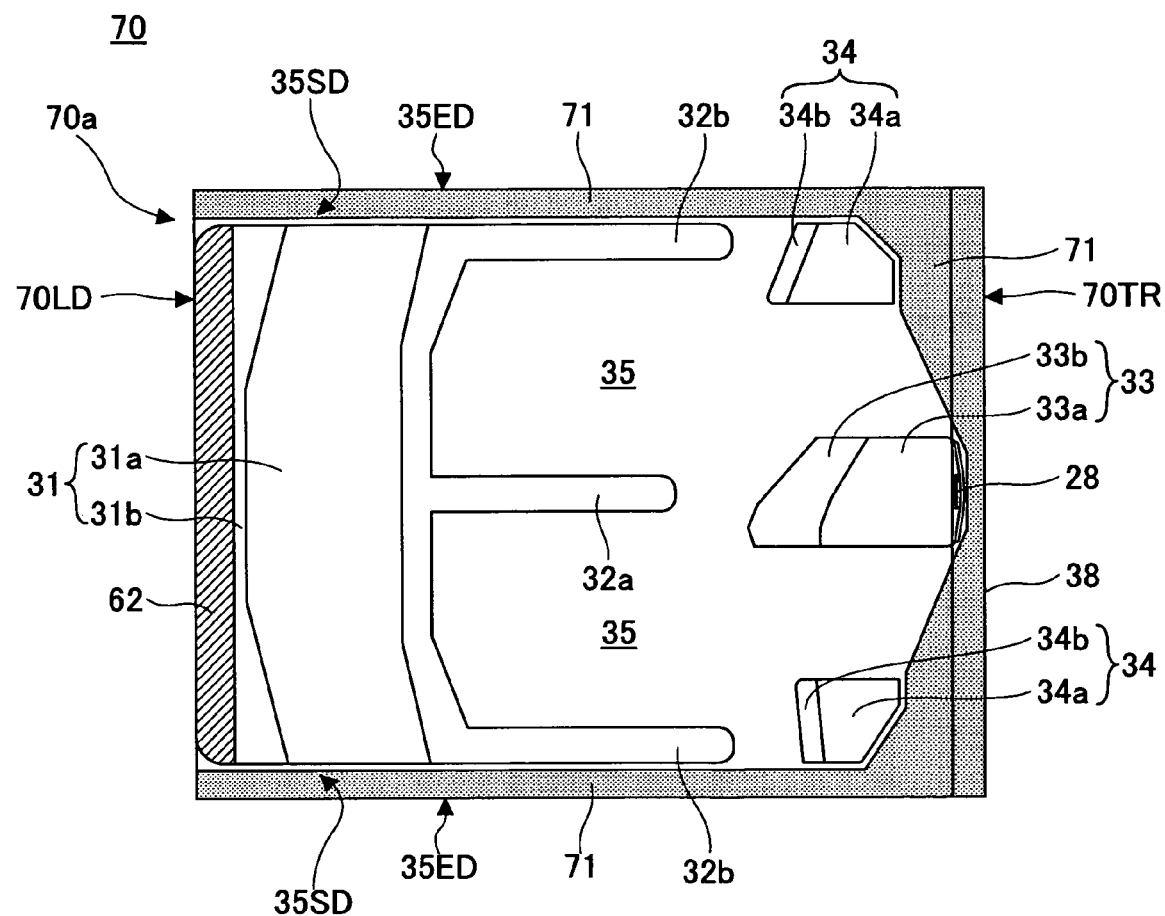
FIG. 12 is a plan view of a medium opposing surface of a head slider of a fifth example magnetic head according to the embodiment of the present invention.

FIG. 12 is a plan view of a medium opposing surface 70*a* of a head slider 70 of the fifth example magnetic head. In FIG. 12, the elements corresponding to those described above are referred to by the same numerals, and a description thereof is omitted.

Referring to FIG. 12, according to the fifth example magnetic head, the buffer pad 62 and a buffer pad 71 are provided on the medium opposing surface 70*a* of the head slider 70. The head slider 70 has the buffer pad 71 formed continuously along the airflow direction on the surface of each of the side edge parts 35SD of the groove part 35 on both width-directional sides on the medium opposing surface 70*a*. Further, the buffer pad 71 is continuously formed widthwise at an air outgoing end 70TR. Further, the buffer pads 62 and 71 are formed to extend not only on the peripheral part of the medium opposing surface 70*a* but also on the surface of the groove part 35 on the air outgoing end 70TR side of the rear side rails 34 and the rear center rail 33. By thus increasing the area of the buffer pad 71, it is possible to increase the strength of the buffer pad 71 itself. As a result, the durability of the buffer pad 71 further increases.

However, no buffer pad is provided in the groove part 35 in the area on the air incoming end 70LD side of the rear center rail 33 and the rear side rails 34 on the air outgoing end TR side of the front rail 31, the center rail 32*a*, and the side rails 32*b*. Hereinafter, this area is referred to as "area A." That is, the base material of the head slider 70 is exposed in the groove part 35 of the area A. The area A is an area where negative pressure is generated. The depth of the groove part 35 relative to the air bearing surfaces 31*a*, 33*a*, and 34*a* and the step surfaces 31*b*, 33*b*, and 34*b* affects the magnitude of the negative pressure. If a buffer pad is formed in the area A, the variation due to the film thickness of the buffer pad is added to the variations of the depth of the groove part 35 due to etching, thereby increasing variations in the negative pressure. However, since no buffer pad is provided in the area A of the head slider 70, it is possible to avoid an increase in variations in the negative pressure, so that it is possible to avoid affecting flight characteristics.

The fifth example magnetic head produces the same effects as the fourth example magnetic head. Further, according to the fifth example magnetic head, the buffer pad 71 is formed to also extend on the surface of the groove part 35 on the air outgoing end 70TR side of the rear side rails 34 and the rear center rail 33. Accordingly, it is possible to increase the strength of the buffer pad 71 itself. As a result, the durability of the buffer pad 71 further increases.

Next, a description is given of a sixth example magnetic head according to this embodiment. The sixth example magnetic head is a variation of the third example magnetic head shown in FIGS. 9A and 9B. The sixth example magnetic head has the same configuration as the third example magnetic head except for the buffer pad configuration of the medium opposing surface of the head slider.

Figure 13:
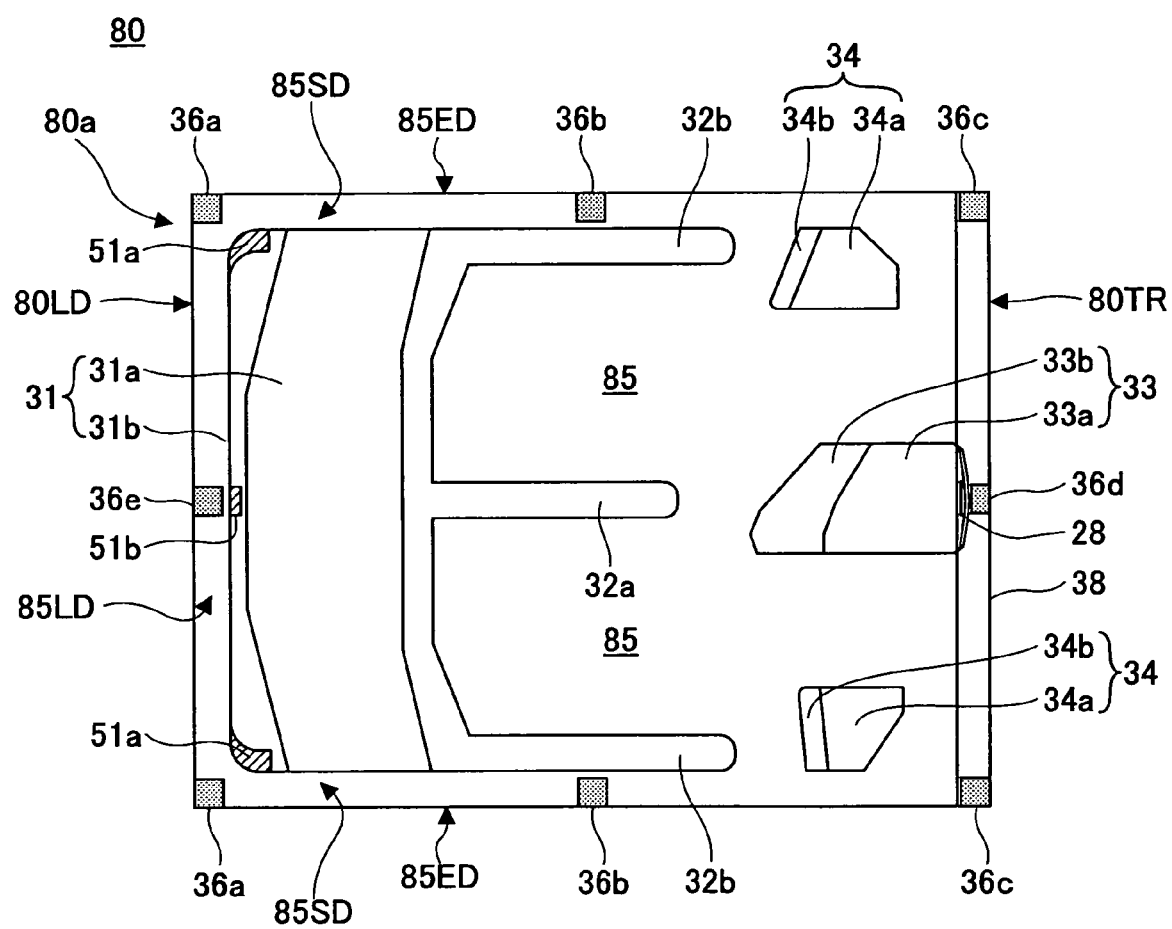
FIG. 13 is a plan view of a medium opposing surface of a head slider of a sixth example magnetic head according to the embodiment of the present invention.

FIG. 13 is a plan view of a medium opposing surface 80*a* of a head slider 80 of the sixth example magnetic head. In FIG. 13, the elements corresponding to those described above are referred to by the same numerals, and a description thereof is omitted.

Referring to FIG. 13, according to the sixth example magnetic head, in addition to a groove part 85, the head slider 80 further has a groove part 85LD provided on the air incoming end 80LD side on the medium opposing surface 80*a*. The head slider 80 has the same medium opposing surface configuration as the magnetic sliders of the first through fifth example magnetic heads except that the groove part 85LD is provided. A buffer pad 36*e* is provided in the substantial width-directional center of the surface of the groove part 85LD. The material and film thickness of the buffer pad 36*e* are within the same ranges as those of the buffer pads 36 of the first example shown in FIGS. 4 through 5B. This prevents the base material of the head slider 80 from directly contacting and damaging the surface of the magnetic disk 12 when the air incoming end 80LD of the head slider 80 comes into contact with the surface of the magnetic disk 12.

Further, the head slider 80 has the buffer pads 51*a* provided on both width-directional sides and the buffer pad 51*b* provided in the width-directional center on the step surface 31*b* of the front rail 31 of the medium opposing surface 80*a*. The configuration of the buffer pads 51*a* and the configuration of the buffer pad 51*b* are the same as in the third example magnetic head shown in FIGS. 9A through 10. As a result, the air incoming end 80LD side of the step surface 31*b* is prevented from coming into direct contact with the surface of the magnetic disk 12. It is preferable to provide the buffer pads 51*a* and 51*b*, but the buffer pads 51*a* and 51*b* may be omitted.

The sixth example magnetic head produces the same effects as the third example magnetic head. Further, since the sixth example magnetic head includes the buffer pads 36*a* and 36*e*, it can be ensured that the base material of the head slider 80 at the air incoming end 80LD is prevented from directly contacting and damaging the surface of the magnetic disk 12.

Next, a description is given of a seventh example magnetic head according to this embodiment. The seventh example magnetic head is a variation of the sixth example magnetic head shown in FIG. 13. The seventh example magnetic head has the same configuration as the sixth example magnetic head except for the buffer pad configuration of the medium opposing surface of the head slider.

Figure 14:
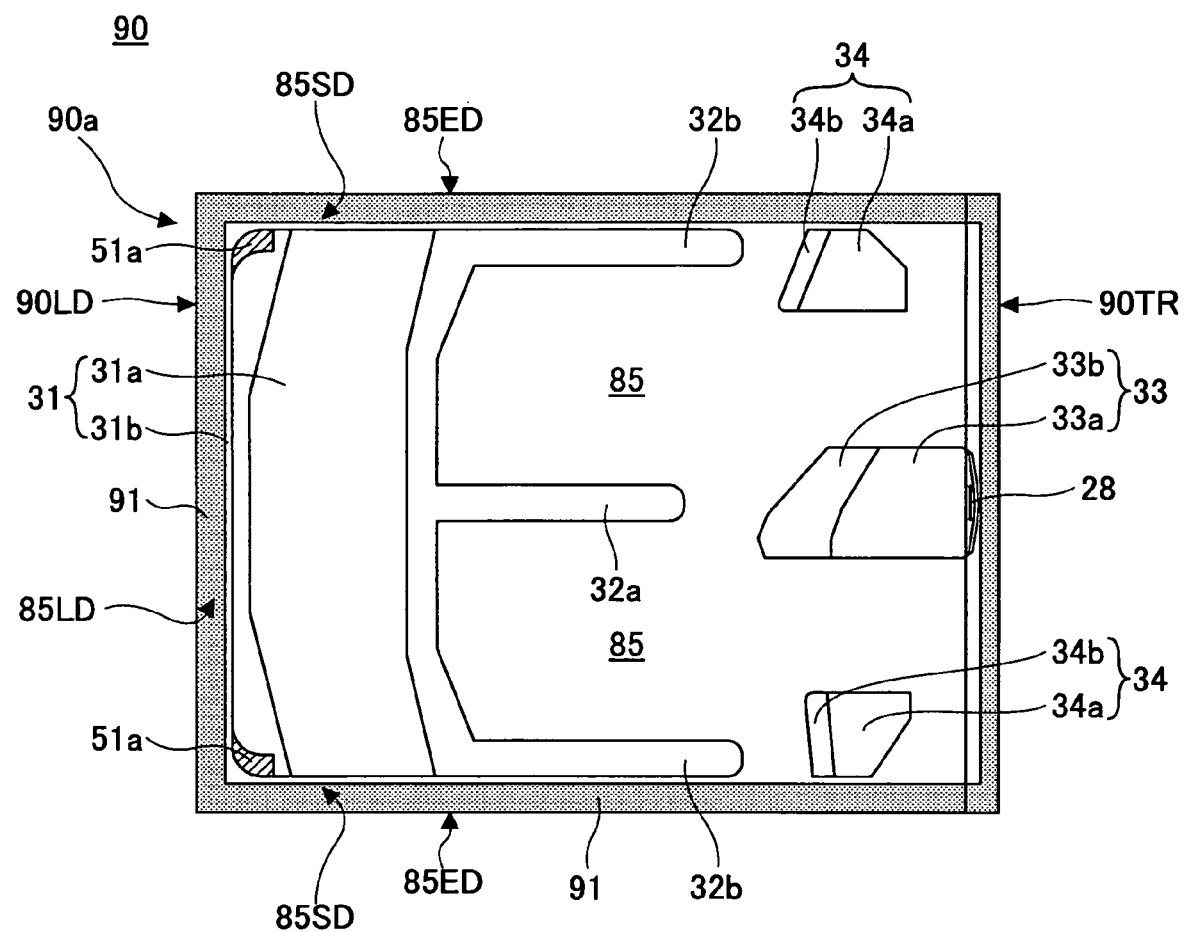
FIG. 14 is a plan view of a medium opposing surface of a head slider of a seventh example magnetic head according to the embodiment of the present invention.

FIG. 14 is a plan view of a medium opposing surface 90*a* of a head slider 90 of the seventh example magnetic head. In FIG. 14, the elements corresponding to those described above are referred to by the same numerals, and a description thereof is omitted.

Referring to FIG. 14, according to the seventh example magnetic head, the head slider 90 has a buffer pad 91 provided on the surface of the groove part 85 in the peripheral part of the medium opposing surface 90*a*. The buffer pad 91 is formed continuously at side edge parts 85SD of the groove part 85 on both width-directional sides thereof, an air incoming end 90LD, and an air outgoing end 90TR, so as to surround the front rail 31, the center rail 32*a*, the side rails 32*b*, the rear center rail 33, and the rear side rails 34. As a result, even if the head slider 90 happens to be inclined in any direction, the buffer pad 91 prevents the base material of the head slider 90 from directly contacting and damaging the surface of the magnetic disk 12 when the head slider 90 comes into contact with the surface of the magnetic disk 12. The head slider 90 has the buffer pads 51a provided on both width-directional sides on the step surface 31b of the front rail 31 of the medium opposing surface 90a. It is preferable to provide the buffer pads 51a as in the sixth example magnetic head, but the buffer pads 51a may be omitted.

The seventh example magnetic head produces the same effects as the sixth example magnetic head. Further, according to the seventh example magnetic head, the buffer pad 91 is formed continuously on the side edge parts 85SD of the groove part 85 on both width-directional sides thereof along the airflow direction and at the air incoming end 90LD and the air outgoing end 90TR along the width direction on the surface of the groove part 85 in the peripheral part of the medium opposing surface 90a. Accordingly, when the head slider 90 is off balance to be displaced from the flying position, the buffer pad 91 comes into contact with the surface of the magnetic disk 12. Accordingly, it can be ensured that the base material of the head slider 90 is prevented from coming into direct contact with the surface of the magnetic disk 12, so that the base material of the head slider 90 is even less likely to damage the surface of the magnetic disk 12.

According to one embodiment of the present invention, a buffer member is formed on the surface of a groove part lower than an air bearing surface in the peripheral part of a medium opposing surface, so that the peripheral part of the medium opposing surface comes into contact with the surface of a magnetic recording medium through the buffer member when a head slider happens to be off balance to be displaced from the flying position. Accordingly, it is possible to prevent the surface of the magnetic recording medium from being damaged.

According to one embodiment of the present invention, it is possible to prevent the surface of a magnetic recording medium from being damaged even if a magnetic head comes into contact with the magnetic recording medium. Accordingly, it is possible to provide a highly reliable magnetic disk unit.

According to one embodiment of the present invention, first, a protection film covering at least an element part is formed so as to prevent the element part from being damaged by subsequent grinding, and a buffer member is selectively formed after forming a groove part. As a result, a magnetic head in which the buffer member reduces an effect on the flight characteristics of the magnetic head can be formed.

Thus, according to one embodiment of the present invention, it is possible to provide a magnetic head in which an adverse effect on its flight characteristics is reduced and which is capable of reducing the degree of damage caused to the surface of a magnetic disk in the case of colliding with the surface of the magnetic disk.

The present invention is not limited to the specifically disclosed embodiment, and variations and modifications may be made without departing from the scope of the present invention.

For example, the present invention may be applied in the case of forming an element part on a rear side rail instead of forming it on a rear center rail.

Further, the present invention is not limited to magnetic heads of the complete flying type, and is also applicable to, for example, magnetic heads of the near-contact type and the contact type.

The present application is based on Japanese Priority Patent Application No. 2006-060014, filed on Mar. 6, 2006, the entire contents of which are hereby incorporated by reference.

What is claimed is:

1. A magnetic head, comprising:
a head slider having a medium opposing surface to oppose a magnetic recording medium, the head slider being configured to fly by receiving airflow, caused by movement of the magnetic recording medium, on the medium opposing surface, the medium opposing surface including an air bearing surface and a groove part, the groove part being lower than the air bearing surface; and
a buffer member configured to prevent the magnetic recording medium from being damaged when the groove part comes into contact with the magnetic recording medium, the buffer member being provided on a part of a surface of the groove part in a peripheral part of the medium opposing surface, the buffer member being formed of a carbon film deposited on the part of the surface of the groove part and being lower than the air bearing surface;
wherein the buffer member is provided continuously along a direction of the airflow in opposing side edge parts of the medium opposing surface.

2. A magnetic head, comprising:
a head slider having a medium opposing surface to oppose a magnetic recording medium, the head slider being configured to fly by receiving airflow, caused by movement of the magnetic recording medium, on the medium opposing surface, the medium opposing surface including an air bearing surface and a groove part, the groove part being lower than the air bearing surface; and
a buffer member configured to prevent the magnetic recording medium from being damaged when the groove part comes into contact with the magnetic recording medium, the buffer member being provided on a part of a surface of the groove part in a peripheral part of the medium opposing surface, the buffer member being formed of a carbon film deposited on the part of the surface of the groove part and being lower than the air bearing surface; wherein
the medium opposing surface has a step part lower than the air bearing surface and higher than the groove part; and
an additional buffer member configured to prevent the magnetic recording medium from being damaged when the step part comes into contact with the magnetic recording medium is formed in a part of a surface of the step part in the peripheral part of the medium opposing surface.

3. The magnetic head as claimed in claim 2, wherein the additional buffer member is provided at an air incoming end of the step part in opposing side edge parts of the medium opposing surface.

4. The magnetic head as claimed in claim 2, wherein the additional buffer member has substantially a same hardness as a protection film formed on a surface of the magnetic recording medium.

5. A magnetic head, comprising:
a head slider having a medium opposing surface to oppose a magnetic recording medium, the head slider being configured to fly by receiving airflow, caused by movement of the magnetic recording medium, on the medium opposing surface, the medium opposing surface including an air bearing surface and a groove part, the groove part being lower than the air bearing surface; and a buffer member configured to prevent the magnetic recording medium from being damaged when the groove part comes into contact with the magnetic recording medium, the buffer member being provided on a part of a surface of the groove part in a peripheral part of the medium opposing surface, wherein the buffer member is provided continuously along a direction of the airflow in opposing side edge parts of the medium opposing surface.

6. A magnetic head, comprising:

a head slider having a medium opposing surface to oppose a magnetic recording medium, the head slider being configured to fly by receiving airflow, caused by movement of the magnetic recording medium, on the medium opposing surface, the medium opposing surface including an air bearing surface and a groove part, the groove part being lower than the air bearing surface; and a buffer member configured to prevent the magnetic recording medium from being damaged when the groove part comes into contact with the magnetic recording medium, the buffer member being provided on a part of a surface of the groove part in a peripheral part of the medium opposing surface, wherein the medium opposing surface has a step part lower than the air bearing surface and higher than the groove part, an additional buffer member configured to prevent the magnetic recording medium from being damaged when the step part comes into contact with the magnetic recording medium is formed in a part of a surface of the step part in the peripheral part of the medium opposing surface, and the additional buffer member is provided at an air incoming end of the step part in opposing side edge parts of the medium opposing surface.

* * * * *